(12) United States Patent
Guillemot et al.

(10) Patent No.: US 7,729,807 B2
(45) Date of Patent: Jun. 1, 2010

(54) SECURITY SENSOR-TRANSMITTER FOR DETECTING WIND IN A HOME AUTOMATION INSTALLATION

(75) Inventors: Eric André Georges Guillemot, Scionzier (FR); Bernard Grehant, Nancy-sur-Cluses (FR)

(73) Assignee: Somfy SAS, Cluses (FR)

( * ) Notice: Subject to any disclaimer, the term of this patent is extended or adjusted under 35 U.S.C. 154(b) by 153 days.

(21) Appl. No.: 11/958,545

(22) Filed: Dec. 18, 2007

(65) Prior Publication Data

US 2008/0150717 A1 Jun. 26, 2008

(30) Foreign Application Priority Data

Dec. 26, 2006 (FR) .................................. 06 11370

(51) Int. Cl.
G06F 19/00 (2006.01)
G05B 15/00 (2006.01)

(52) U.S. Cl. ............................. 700/275; 700/1; 160/7; 340/5.21

(58) Field of Classification Search ................ 700/1, 700/275; 160/1, 7; 340/5.1, 5.2, 5.21
See application file for complete search history.

(56) References Cited

U.S. PATENT DOCUMENTS

| 6,441,719 | B1 * | 8/2002 | Tsui ........................... 340/5.21 |
| 6,484,069 | B2 * | 11/2002 | Osinga ....................... 700/275 |
| 6,732,018 | B2 * | 5/2004 | Osinga ....................... 700/275 |
| 6,798,158 | B2 * | 9/2004 | Evans .......................... 318/266 |
| 7,123,144 | B2 * | 10/2006 | Anderson et al. ........ 340/545.1 |
| 2003/0069670 | A1 * | 4/2003 | Osinga ....................... 700/275 |
| 2004/0031321 | A1 | 2/2004 | Orsat |
| 2004/0186595 | A1 | 9/2004 | Baud et al. |
| 2005/0017663 | A1 * | 1/2005 | Anderson et al. ........... 318/280 |
| 2005/0242763 | A1 | 11/2005 | Grehant et al. |

FOREIGN PATENT DOCUMENTS

| EP | 1 122 378 A | 8/2001 |
| EP | 1 586 964 A | 10/2005 |
| EP | 1 598 518 A | 11/2005 |
| FR | 2 811 431 | 1/2002 |
| FR | 2 828 319 | 2/2003 |
| JP | 5-54269 | 3/1993 |
| WO | WO 99/36886 | 7/1999 |
| WO | WO 03/015049 | 2/2003 |

* cited by examiner

*Primary Examiner*—Ramesh B Patel
*Assistant Examiner*—Douglas S Lee
(74) *Attorney, Agent, or Firm*—Frommer Lawrence & Haug LLP; Ronald R. Santucci

(57) ABSTRACT

A sensor-transmitter (20) intended to be fastened to a mobile structure (11, 13, 14) and to transmit a security signal in a home automation installation (10), comprising, in a casing (22, 23): an autonomous power source (36), a vibration sensor (33), a wireless transmitter (35) and a processing logic unit (34) analyzing the signals obtained from the vibration sensor to decide whether to transmit the security signal by the wireless transmitter, which comprises means (27, 32) of detecting the mechanical state of the casing, the sensor-transmitter being:

in an operational state when the casing is closed and fastened to the mobile structure, the transmission of a security signal being enabled in this operational state, and
in a disabled state otherwise,
    the transmission of a security signal being prohibited in this disabled state, whereas the transmission of other signals remains possible, or
    the transmission of a security signal being enabled in this disabled state, the security signal being disabled by a disabling signal.

12 Claims, 3 Drawing Sheets

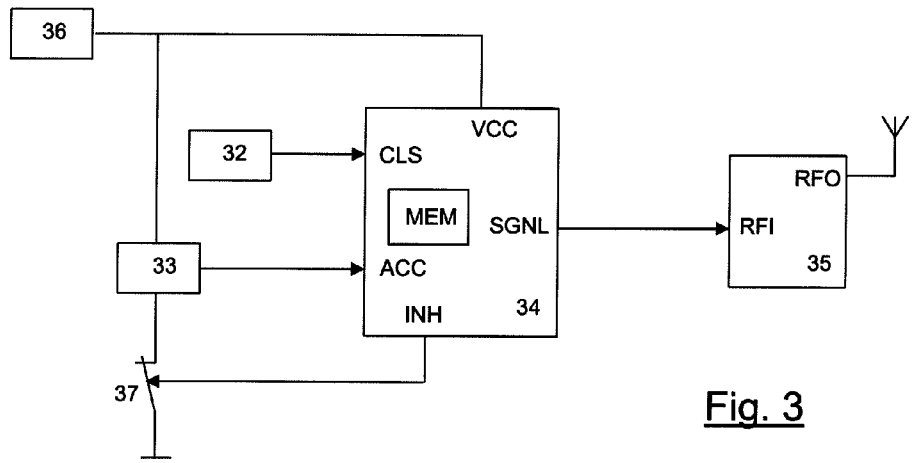
Fig. 3
Fig. 4
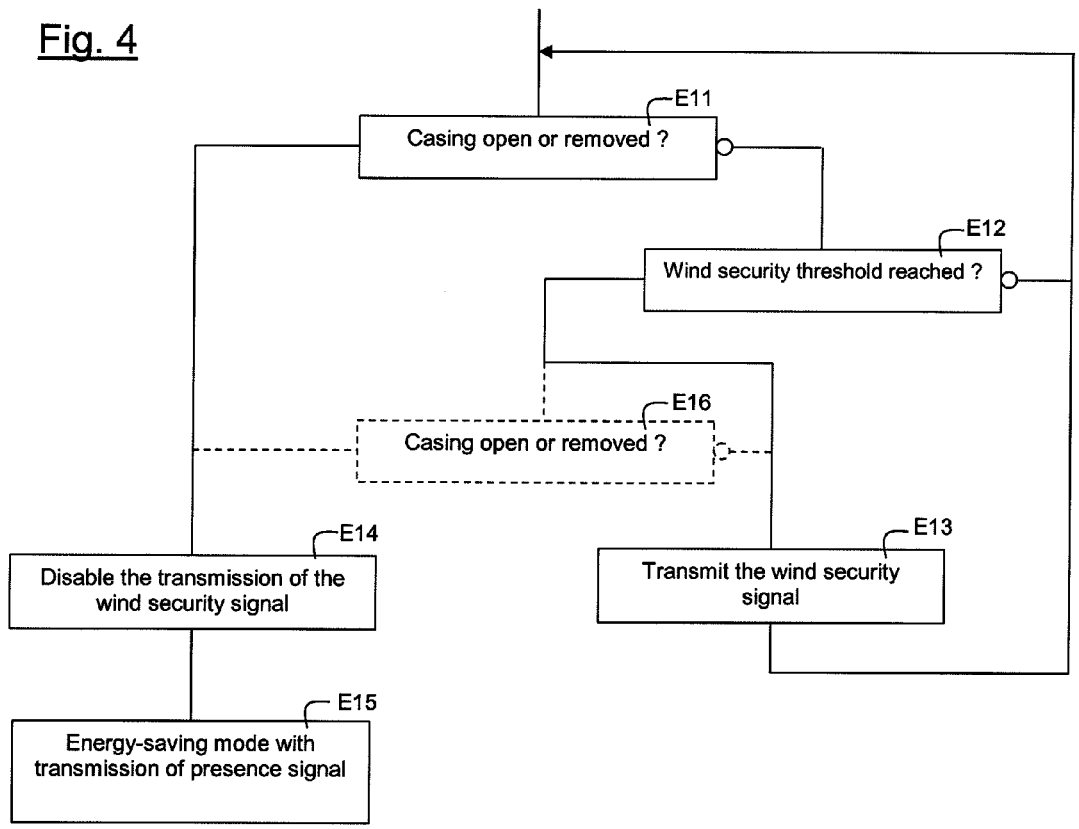

SECURITY SENSOR-TRANSMITTER FOR DETECTING WIND IN A HOME AUTOMATION INSTALLATION

This application claims priority benefits from French Patent Application No. FR 06 11370 filed Dec. 26, 2006, the disclosure of which is hereby incorporated by reference.

BACKGROUND OF THE INVENTION

The invention relates to a security sensor-transmitter positioned on a motorized mobile structure in a home or building automation installation, in particular a motorized blind or awning, to a disabling method and to a learning method for such a sensor-transmitter. The sensor-transmitter includes a wireless transmitter so as to transmit a security signal.

DESCRIPTION OF THE PRIOR ART

The use of vibration sensors is known, comprising, for example, an accelerometer, for detecting the movements due to the wind on such a mobile structure. The sensor is fastened against the mobile structure, in a place where the effects of the wind are particularly important. It also comprises a device for analyzing signals obtained from the accelerometer, and a radio transmitter for sending to a motor control unit a awning retraction control when the level of vibrations exceeds a predetermined threshold.

Such a device is known, for example, from patent application FR 2 811 431.

The sensor is self-powered, powered by a primary battery or by a rechargeable battery and a photovoltaic-type panel.

Two problems posed by this type of sensor are the assignment of the setting thresholds (to adjust the sensor's sensitivity level) and the replacement of the battery.

In practice, it is important for the sensor to include a perfectly watertight casing, because the mobile structure, sensitive to the effects of the wind, is also subject to bad weather, humidity or salt fogs.

The dry battery and/or the means of setting the threshold or thresholds are accessible only after the casing is taken apart, which entails, more often than not, separating the sensor from the structure.

Now, the movements resulting from these operations can lead to the transmission of a wind detection signal, automatically provoking the closing of the mobile structure. By its unexpected nature, this automatic movement can be particularly hazardous, for instance if the sensor is positioned on the load bar of a arm awning, and if the user, or installer has deployed the awning to access more easily the load bar using a stepladder.

Moreover, the adjustment of a setting potentiometer will be difficult if the latter is inside a closed casing. Conversely, making the control of the potentiometer accessible from the outside would considerably increase the cost, because of the seal-tightness constraint.

The same issue arises for a security sensor (obstacle detection) positioned in a final blade of a motorized rolling shutter, or on the bottom part of a motorized garage door, for which it is desirable to adjust the detection sensitivity in an at least partially closed position of the shutter or the door.

Patent application EP 1 598 518 discloses activating such an obstacle detection sensor, positioned at the end of a final blade, at the point of transition of a magnet positioned in the lateral slideway of the shutter.

Patent application WO 99/36886 discloses proceeding in such a way that a transponder intended for remote automobile toll applications and contained in a mobile casing becomes totally incapable of operating without a communication signal from a security device housed in the support, bonded to the windscreen, and made inactive on any attempt to destroy the adhesive joint. Furthermore, the security device and the mobile part are paired, such that the mobile part can operate only on another car which also includes a support of the same type.

Patent application EP 1 415 290 discloses the fact that a remote control switches from a manual operating mode to an automatic operating mode in a home automation installation, depending on whether or not it is placed on its support.

Finally U.S. Pat. No. 7,123,144 discloses securing an automatic door control system by transmitting a signal to a receiver if the transmitter module is open or removed (col. 6 lines 13-18). A similar function is obtained in anti-theft alarm systems, for which the sensors-transmitters are housed in casings that automatically transmit a warning signal to an alarm unit if the unit is torn away or opened. Patent application JP 05054269 discloses such an operation.

SUMMARY OF THE INVENTION

The aim of the invention is to provide a sensor-transmitter that obviates the abovementioned drawbacks and that enhances the sensors-transmitters known from the prior art. In particular, the invention proposes a sensor-transmitter with a simple structure which facilitates and makes less hazardous the setting operations, in particular the transmission threshold setting operations. The invention also relates to a learning method and an operating method of such a sensor-transmitter.

The sensor-transmitter according to the invention is defined by claim 1.

Various embodiments of the sensor-transmitter are defined by claims 2 and 3.

The home automation installation according to the invention is defined by claim 4.

Various embodiments of the installation are defined by claims 5 and 6.

The operating method of a sensor-transmitter according to the invention is defined by claim 7.

A mode of execution of the operating method is defined by claim 8.

The learning method of a sensor-transmitter according to the invention is defined by claim 9.

Various execution modes of the learning method are defined by claims 10 and 11.

DESCRIPTION OF THE DRAWINGS

The appended drawing shows, by way of example, one embodiment of a sensor-transmitter according to the invention, an execution mode of a learning method of a sensor-transmitter according to the invention and an operating mode of a sensor-transmitter according to the invention.

FIG. 3 is an electrical diagram of a sensor-transmitter according to the invention.

FIG. 4 is a flow diagram representing one execution mode of an operating method of a sensor-transmitter according to the invention.

DESCRIPTION OF THE PREFERRED EMBODIMENTS

Figure 1:
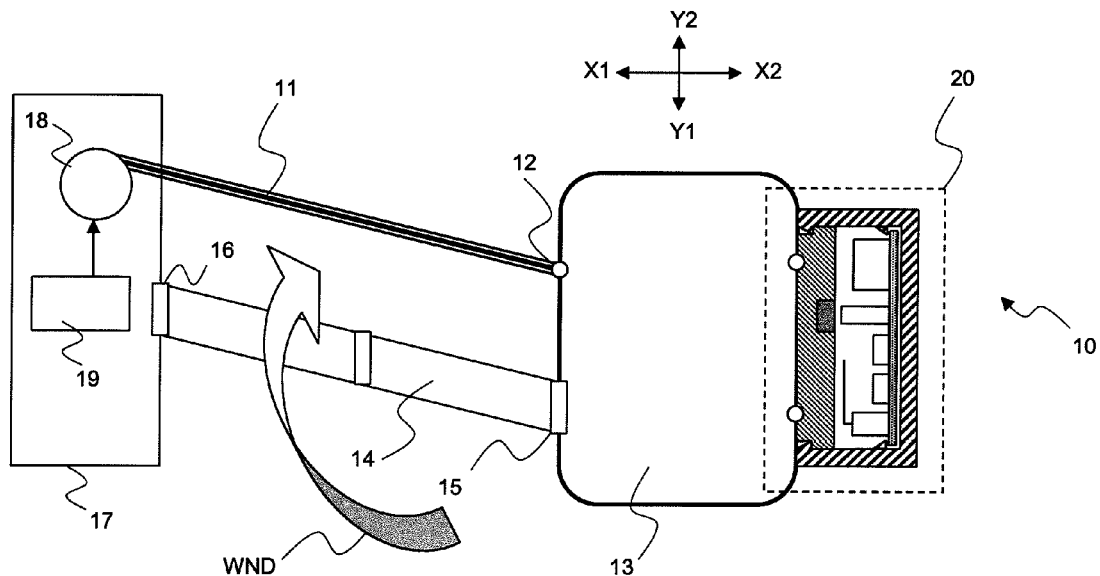
FIG. 1 is a diagram of an installation comprising a sensor-transmitter according to the invention.

FIG. 1 represents an installation 10 comprising a motorized arm awning, the fabric 11 of which is attached by a fastening 12 to a load bar 13. The fabric winds onto a motorized tube 18. When the motor winds the fabric onto the winding tube, the latter provokes the movement of the load bar 13 in the direction X1 and, to a lesser extent, in the direction Y2. A plurality of articulated arms 14, provided with springs, make it possible to exert a force on the load bar 13 in the direction X2 and, to a lesser extent, in the direction Y1 so as to keep the fabric taut. The articulated arm 14 is connected to the load bar by a first articulation 15. The articulated arm comprises other articulations, in particular a second articulation 16 connecting it to the fixed structure 17 of the installation, which comprises the motorized winding tube. The load bar, fabric and articulated arms constitute the mobile structure.

The installation 10 also comprises a sensor-transmitter 20, fastened on the load bar 13. The sensor-transmitter 20 could be situated in any position such that the wind (represented by a solid arrow WND), acting on the fabric 11 provokes movements of the mobile structure, in particular of the position where the sensor-transmitter is located. The sensor-transmitter 20 transmits a security signal to a control unit 19. This control unit generates the control commands for the motorized tube. It comprises a radiofrequency receiver provided with an antenna, and, where appropriate, a meteorological-type sensor.

Figure 2:
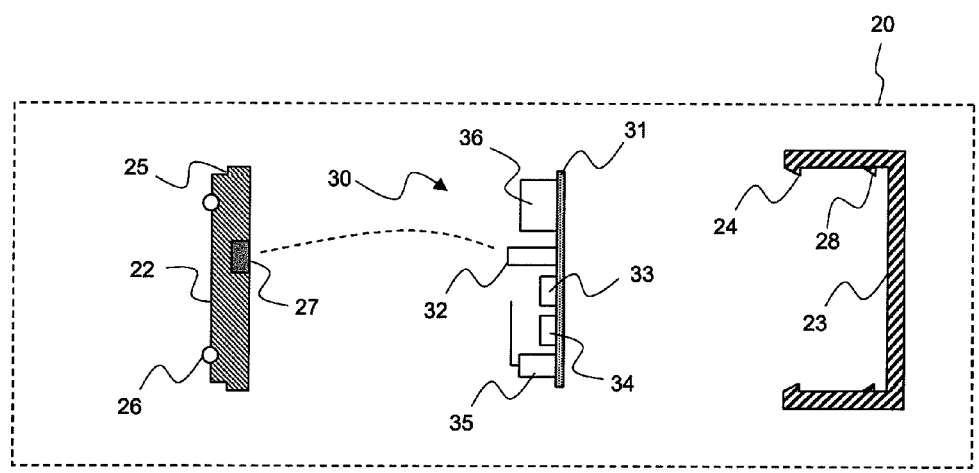
FIG. 2 is an exploded diagram of a sensor-transmitter according to the invention.

FIG. 2 details the elements included in the sensor-transmitter 20. In the preferred embodiment, the sensor-transmitter comprises a base 22 fastened on the mobile structure, and a removable part 23 forming a lid and comprising the electronic components of the sensor-transmitter.

The lid 23 has clips 24 enabling the lid 23 to be attached quickly to the base 22 in recesses 25. The base is rigidly fastened to the load bar 13 by fastening means 26 represented by circles. These can be simply screws. The base finally comprises a primary casing closure detection element 27, for example a magnet, a reflecting tab or a stud that can act on a switch. The base and the lid form the casing of the sensor-transmitter.

The sensor-transmitter 20 also comprises an electronic circuit 30. The components are mounted on a printed circuit 31, fastened to the lid 23 by fastening studs 28. These components include a secondary casing closure detection element 32, for example a reed switch controlled by a magnet, an optocoupler or a simple mechanical switch. The secondary element cooperates with the primary element, as represented by a broken curved line, to create an electric state representative of the closure state of the casing.

The printed circuit also supports a vibration sensor 33, for example an accelerometer or a ball and contact type inertial detector, or any motion detection device.

A processing logic unit 34, for example a microcontroller, a radio transmitter 35 and its antenna, a dry battery 36 are also located on the printed circuit 31 of the sensor-transmitter.

The links between these elements are specified by FIG. 3.

The processing logic unit 34 is powered by the dry battery 36 as is the vibration sensor 33 if a controlled switch 37 is closed. The signals from the vibration sensor 33 are transmitted to a first input ACC of the processing logic unit. The secondary casing closure element 32 has its output connected to a second input CLS of the processing logic unit. This input is in the low logic state as long as the casing is closed. In this case, the signals from the vibration sensor are processed, and, if they exceed one or more predetermined threshold(s), then a control signal is transmitted from a first output SGNL of the processing logic unit to an input RFI of the radio transmitter 35, an output RFO of which powers a radiofrequency antenna, and which then transmits a "wind" security signal.

Alternatively, the primary and secondary elements detect not the opening of the casing, but its fastening in a predetermined location of the mobile structure. For example, a magnet serves as primary element and is positioned at a point of the mobile structure, whereas a Reed sensor serves as secondary element. The primary element can also comprise a simple U-shaped ferromagnetic part positioned on the mobile structure, while the magnet and the Reed sensor are placed in the casing. When the casing is placed in the vicinity of the ferromagnetic part, the latter channels the magnetic flux from the magnet and returns it to the Reed sensor.

In order to allow casings to be interchangeable should the replacement of a defective element be required, any primary element can cooperate with any secondary element when they are elements of the same type.

If the logic input CLS goes to the high state, then the processing logic unit no longer takes account of the signal from the vibration sensor. In the embodiment represented in FIG. 3, a controlled opening switch 37 is driven by a disabling output INH of the processing logic unit 34, which has the effect of canceling the power supply to the vibration sensor 33, and therefore any signal from the latter. Alternatively, the processing logic unit 34 can simply stop analysis processing of the signals present on its input ACC, or even temporarily block the sending of a signal transmission command to the radio transmitter 35, or finally temporarily cancel the power supply for the radio transmitter 35 by a means similar to the controlled switch 37, or by using the same controlled switch 37 to cut the power supply to the vibration sensor and the radio transmitter.

FIG. 4 represents an execution mode of the operating method according to the invention, in the form of a flow diagram.

In a first step E11, a test is run to see if the casing is open or removed. If it is not open or removed, the method goes to a second step E12, in which a test is carried out to see if the wind security threshold is reached, that is, if the signals from the vibration sensor exceed a predetermined threshold. If the threshold is not reached, the method loops to the first step E11. A one or two-second sleep state can advantageously be inserted before the return to the first step E11.

If the security threshold is reached or exceeded, the method goes on to a third step E13 in which the sensor-transmitter transmits a security signal, or alternatively a retraction command signal, in order to retract the awning. The method then loops to the first step E11. All of the first three steps constitute the monitoring mode. The sensor-transmitter is then said to be in an operational state.

If, in the first step E11, it is detected that the casing is open and/or removed, the method goes to a fourth step E14 in which the sensor-transmitter is disabled, or, more precisely, its transmission of wind security signals or awning retraction control signals is disabled. Thus, the sensor-transmitter does not transmit radio information on the presence of wind, even if the sensor-transmitter is subjected to significant movements. The disabling of the wind security signal is provoked, for example, by cutting off the power supply of the vibration sensor. As noted above, other simple means can provoke the disabling. The sensor-transmitter is then said to be in a disabled state.

In the disabled state, certain transmission functionalities remain activatable.

In a subsequent step E15, the sensor-transmitter switches to energy-saving mode. This energy-saving mode includes a regular waking-up, for example every 15 minutes, with transmission of a presence signal. In practice, to ensure greater security, the control unit 19 automatically provokes the retraction of the awning if it notices an error in the operation of the sensor-transmitter 20, for example the non-reception of a presence signal. It is necessary that the opening of the sensor-transmitter casing cannot lead to an automatic awning retraction both because of the movements of the sensor-transmitter due to its opening or its removal and/or because of an end in the transmission of this presence signal.

As a variant, the step E13 comprises the transmission of a specific signal addressed to the control unit 19 to signal to it an intervention on the sensor-transmitter. The control unit then cancels listening for the presence signal. The sensor-transmitter can therefore cancel the transmissions of a presence signal in the energy-saving mode, provided that there is transmission of a specific signal.

The opening of the casing and/or its removal can be detected by a change of state of the second input CLS of the processing logic unit. This change of state for example causes an interruption request to the microcontroller included in the processing logic unit.

The insertion of a sixth step E16, represented by a broken line block, and repeating the step E11 after it has been detected that the security threshold is reached, makes it possible to avoid an unwanted retraction of the awning. In practice, immediately the user or the installer begins to manipulate the sensor-transmitter to remove it or to open its casing, there is a risk that the latter will detect vibrations that would be interpreted as due to the presence of wind and that would provoke the transmission of a retraction command signal. The sixth step E16 is advantageously preceded by a delay T0, for example with a duration of one second, so as to avoid such a risk.

Figure 5:
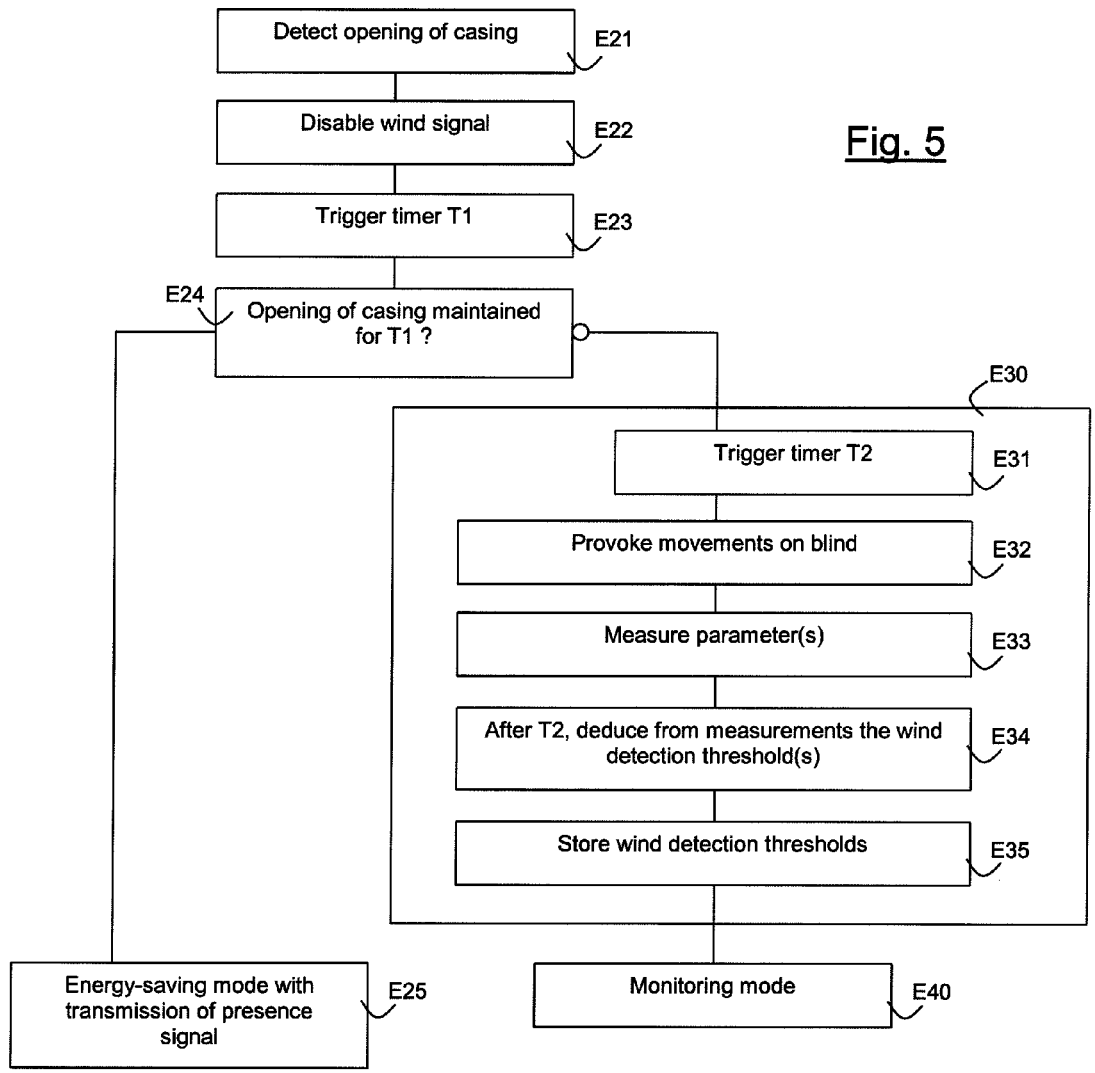
FIG. 5 is a flow diagram representing one execution mode of a learning method of a sensor-transmitter according to the invention.

FIG. 5 describes a learning method according to the invention.

The first step E21 of the learning method is similar to the step E12 of the operating method.

The second step E22 of the learning method is similar to the step E14 of the operating method.

In a third step E23, a first timer T1 is triggered. This timer is of short duration, for example between 2 and 10 seconds.

In a fourth step E24, a test is run to see if the removal and/or the opening of the casing, detected in the first step E21, is maintained for the duration of the first timer. If it is, the method goes on to a fifth step E25 for switching to the energy-saving mode. This step is identical to the step E15 described previously.

However, if the casing has been put back in place for the duration of the first timer, then the method goes on to the setting step E30.

An installer who wants to set the sensitivity thresholds of the sensor-transmitter must therefore execute a very simple operation: remove the sensor-transmitter casing from its support, and replace it after a few seconds. This operation is performed while the awning is deployed, at least partially.

The entry into the setting step can be confirmed to the installer by a sensory signal: for example, a beep transmitted by the sensor-transmitter, or preferably by the control unit 19 after the latter has received a radio message from the sensor-transmitter informing it of the entry into the setting step.

Besides this preliminary indication substep, not represented, the setting step comprises five substeps.

In a first substep E31, a second timer T2 is triggered. This timer has a longer duration than the previous one, for example between 30 seconds and 3 minutes.

During this period, the installer manually provokes an agitation of the awning representative of the effects of the wind, which constitutes a second substep E32. By construction, an awning is capable of withstanding fairly violent gusts of wind, but the agitation of the structure gives the user a worrying perception. It is therefore desirable for the installer to impart on the awning an agitation movement corresponding to what would seem worrying to the user, and not to what the awning could truly withstand.

In a third substep E33, the vibration parameters picked up by the vibration sensor are measured and stored. This substep takes place during the period of the second timer.

After the second timer T2, the method goes on to a fourth substep E34, in which the wind detection threshold, or the wind detection thresholds, are determined according to measurements carried out and according to empirical algorithms or rules.

For example, a threshold is determined from the highest value measured, or from the average of the ten highest values. It is even possible for a first threshold to be determined for a high oscillation frequency (or for a pulsed operating regime), whereas a second threshold is determined for a low oscillation frequency.

Once the threshold or thresholds have been calculated, the method goes on to the fifth substep E35, in which the threshold or thresholds are stored, in a non-volatile memory MEM contained in the processing logic unit 34.

The setting step is then finished. An optional indication substep, not represented, can indicate to the installer the end of the setting.

The method then goes on to execute a monitoring mode, represented by the final step E40: the sensor-transmitter being set, it is operational.

Thus, therefore, the same detection of opening of a casing of a sensor-transmitter designed according to the teachings of the invention enables in one case the simple disabling of the wind detection signals generated by this sensor-transmitter, and, in another case, an extremely simple installation setting mode.

The disabling of the wind detection signals (or of any security signal) can take several forms. In the simplest case, this disabling is reflected in transmission of the security signal being prohibited. Alternatively, the transmission of the security signal is not prohibited but a second signal is transmitted, indicating the disabled state of the sensor, as soon as the sensor switches to the disabled state. The control unit 19 is then informed that it must no longer take account of the security signal, which has become invalid. The second signal is a disabling signal.

When the sensor switches again to the operational state, a third signal is transmitted to indicate that the security signal is once again enabled.

The invention has been described in the case where the casing of the sensor-transmitter comprises a base and a lid, the electronic circuit being joined to the lid. In another embodiment, the electronic circuit is positioned on the base, whereas the magnet is positioned on the lid.

The invention also applies if the casing comprising the sensor remains fully closed, which is all the more interesting to ensure seal-tightness. Currently, a dry battery for powering the sensor lasts longer than ten years, which enables such a hermetically sealed structure.

In this case, it is the action of removing the casing from its fastening position on the mobile structure that is detected.

In the above description, the casing of the sensor-transmitter can be in four mechanical states:
- closed and fitted,
- open and fitted,
- closed and removed, and
- open and removed.

These four states have two corresponding states of the sensor-transmitter:
- operational (when the mechanical state of the casing is closed and fitted), and
- disabled (when the mechanical state of the casing is open and fitted or closed and removed or open and removed).

However, it is possible to imagine other mechanical states of the casing, other states of the sensor-transmitter and other mapping relationships between the mechanical states of the casing and the states of the sensor-transmitter, without however departing from the context of the invention.

What is claimed are:

1. A sensor-transmitter intended to be fastened to a mobile structure of a motorized awning or blind and to transmit a wind security signal in a home or building automation installation, comprising, in a casing:
    an autonomous power source, a vibration sensor, a wireless transmitter and a processing logic unit analyzing the signals obtained from the vibration sensor to decide whether to transmit the wind security signal by the wireless transmitter, wherein it comprises means of detecting the mechanical state of the casing, the sensor-transmitter being:
    in an operational state when the casing is closed and fastened to the mobile structure, the transmission of the wind security signal being enabled in this operational state, in order to retract the awning or blind when a wind security threshold is reached; and in a disabled state otherwise,
    the transmission of the wind security signal being prohibited in this disabled state, whereas the transmission of other signals remains possible, or
    the transmission of the wind security signal being enabled in this disabled state, the wind security signal being disabled by a disabling signal.

2. The sensor-transmitter as claimed in claim 1, wherein the disabling signal comprises information indicating the disabled state of the sensor.

3. The sensor-transmitter as claimed in claim 1, wherein the other signals include a presence signal.

4. A home automation installation of a motorized awning or blind comprising a mobile structure and a fixed structure comprising a control unit provided with a wireless receiver, and activating a motor on receiving a wind security signal, which comprises a sensor-transmitter comprising, in a casing: an autonomous power source, a vibration sensor, a wireless transmitter and a processing logic unit analyzing the signals obtained from the vibration sensor to decide whether to transmit the wind security signal by the wireless transmitter, wherein it comprises means of detecting the mechanical state of the casing, the sensor-transmitter being: in an operation state when the casing is closed and fastened to the mobile structure, the transmission of the wind security signal being enabled in this operation state, in order to retract the awning or blind when a wind security threshold is reached; and in a disabled state otherwise, the transmission of the wind security signal being prohibited in this disabled state, whereas the transmission of other signals remains possible, or the transmission of the wind security signal being enabled in this disabled state, the wind security signal being disabled by a disabling signal mounted on the mobile structure.

5. A home automation installation of a motorized awning or blind comprising a mobile structure and a fixed structure comprising a control unit provided with a wireless receiver, and activating a motor on receiving a valid wind security signal, which comprises a sensor-transmitter comprising, in a casing: an autonomous power source, a vibration sensor, a wireless transmitter and a processing logic unit analyzing the signals obtained from the vibration sensor to decide whether to transmit the wind security signal by the wireless transmitter, wherein it comprises means of detecting the mechanical state of the casing, the sensor-transmitter being: in an operational state when the casing is closed and fastened to the mobile structure, the transmission of the wind security signal being enabled in this operational state, in order to retract the awning or blind when a wind security threshold is reached; and in a disabled state otherwise, the transmission of the wind security signal being prohibited in this disabled state, whereas the transmission of other signals remains possible, or the transmission of the wind security signal being enabled in this disabled state, the wind security signal being disabled by a disabling signal mounted on the mobile structure.

6. The home automation installation as claimed in claim 4, wherein the mobile structure comprises a motorized arm awning.

7. The home automation installation as claimed in claim 5, wherein the mobile structure comprises a motorized arm awning.

8. An operating method for a sensor-transmitter as claimed in claim 1, which comprises a step in which the mechanical state of the casing is monitored, the sensor-transmitter being positioned in an operational state or in a disabled state according to the mechanical state of the casing.

9. The operating method as claimed in claim 8, wherein, in the disabled state, the sensor-transmitter periodically transmits a presence signal.

10. A learning method for a sensor-transmitter comprising, in a casing: an autonomous power source, a vibration sensor, a wireless transmitter and a processing logic unit analyzing the signals obtained from the vibration sensor to decide whether to transmit the wind security signal by the wireless transmitter, wherein it comprises means of detecting the mechanical state of the casing, the sensor-transmitter being: in an operational state when the casing is closed and fastened to the mobile structure, the transmission of the wind security signal being enabled in this operational state, in order to retract the awning or blind when a wind security threshold is reached; and in a disabled state otherwise, the transmission of the wind security signal being prohibited in this disabled state, whereas the transmission of other signals remains possible, or the transmission of the wind security signal being enabled in this disabled state, the wind security signal being disabled by a disabling signal, which comprises a step in which the mechanical state of the casing is monitored, the sensor-transmitter being positioned in an operational state or in a disabled state according to the mechanical state of the casing and triggering a setting procedure when the sensor-transmitter remains in a disabled state for a duration less than a first predetermined duration.

11. The learning method as claimed in claim 10, wherein the setting procedure comprises:
    a step for manually agitating the mobile structure,
    a measurement step using the vibration sensor and a measurement storage step,
then:
   a step for computing at least one threshold value from the stored measurements, and
   a threshold value storage step.

12. The learning method as claimed in claim 11, wherein the sensor-transmitter switches to the operational state after the setting procedure.

* * * * *